(12) United States Patent
Osenar et al.

(10) Patent No.: US 7,094,346 B2
(45) Date of Patent: Aug. 22, 2006

(54) CROSS-FLOW FILTRATION CASSETTES AND METHODS FOR FABRICATION OF SAME

(75) Inventors: Paul Osenar, Westford, MA (US); Paul Sabin, Needham, MA (US)

(73) Assignee: Protonex Technology Corporation, Southborough, MA (US)

( * ) Notice: Subject to any disclaimer, the term of this patent is extended or adjusted under 35 U.S.C. 154(b) by 112 days.

(21) Appl. No.: 10/392,076

(22) Filed: Mar. 19, 2003

(65) Prior Publication Data

US 2003/0178358 A1   Sep. 25, 2003

Related U.S. Application Data

(60) Provisional application No. 60/365,456, filed on Mar. 19, 2002.

(51) Int. Cl.
*B01D 63/00* (2006.01)
*B05C 5/02* (2006.01)

(52) U.S. Cl. ............... 210/321.75; 210/321.84; 210/321.6; 210/331; 156/356; 264/DIG. 48

(58) Field of Classification Search ........ 210/321.75, 210/331, 321.84, 456, 433.1, 484, 355, 321.6; 156/356; 264/DIG. 48
See application file for complete search history.

(56) References Cited

U.S. PATENT DOCUMENTS

| | | | |
|---|---|---|---|
| 4,016,081 A * | 4/1977 | Martinez et al. ....... | 210/321.75 |
| 4,715,955 A | 12/1987 | Friedman ............... | 210/346 |
| 4,735,718 A | 4/1988 | Peters ................ | 210/321.75 |
| 5,342,517 A | 8/1994 | Kopf .................. | 210/228 |
| 5,437,796 A * | 8/1995 | Bruschke et al. ........ | 210/640 |
| 5,599,447 A | 2/1997 | Pearl et al. ........... | 210/321.75 |
| 5,620,605 A * | 4/1997 | Møller ................ | 210/650 |
| 5,922,200 A | 7/1999 | Pearl et al. ........... | 210/321.75 |
| 6,171,374 B1 | 1/2001 | Barton et al. ............ | 96/7 |
| 2004/0086768 A1* | 5/2004 | Fleckner et al. .......... | 429/38 |

FOREIGN PATENT DOCUMENTS

WO   WO 02/093668 A1   11/2002
WO   WO 02/093672 A2   11/2002

OTHER PUBLICATIONS

U.S. Appl. No. 09/908,359, filed Jul. 18, 2001, Osenar et al.
U.S. Appl. No. 10/278,057, filed Oct. 22, 2002, Osenar et al.

* cited by examiner

*Primary Examiner*—Ana Fortuna
(74) *Attorney, Agent, or Firm*—Linda M. Buckley; Christine C. O'Day; Edwards Angell Palmer & Dodge LLP

(57) ABSTRACT

This invention relates generally to filtration cassettes, and, more particularly to methods of fabricating cross-flow filtration cassettes. Cassettes of the invention are characterized, in part, by an internal porting (e.g., manifolding) feature which eliminates the need for a separate step to seal individual components prior to assembly of the filtration cassette. Filtration cassettes of the present invention can be manufactured from conventional membrane and flow screen components and can utilize both injection molding and vacuum assisted resin transfer molding fabrication processes.

25 Claims, 9 Drawing Sheets

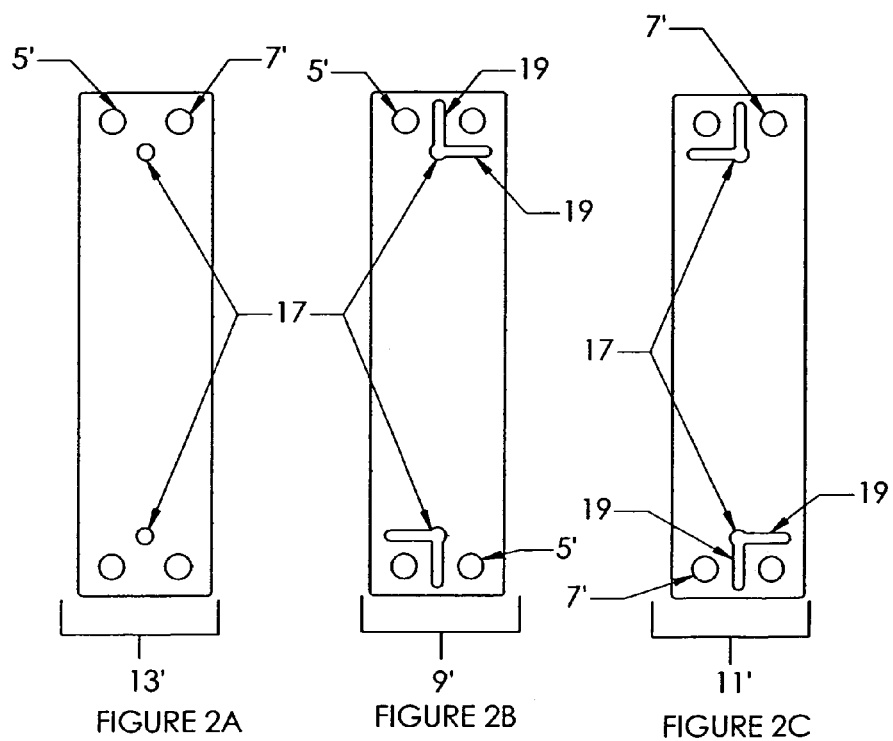

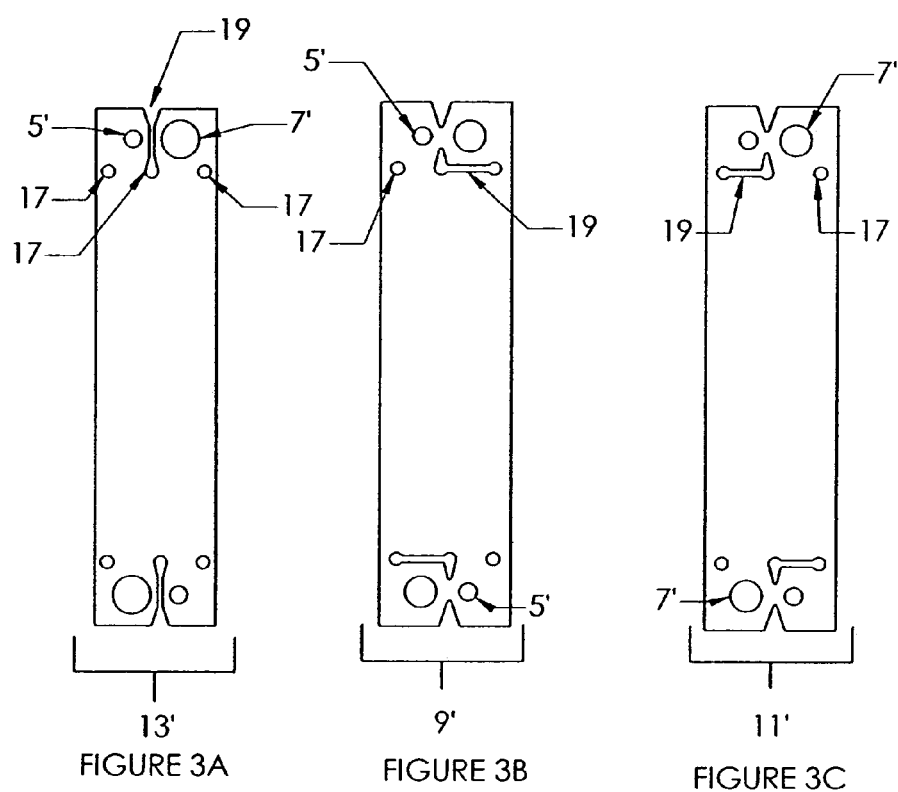

CROSS-FLOW FILTRATION CASSETTES AND METHODS FOR FABRICATION OF SAME

This application claims the benefit of U.S. Provisional Patent Application 60/365,456, filed Mar. 19, 2002, which application is incorporated herein by reference.

BACKGROUND OF THE INVENTION

1. Field of the Invention

This invention relates generally to filtration cassettes, and, more particularly to methods of fabricating cross-flow filtration cassettes. Cassettes of the invention are characterized, in part, by an internal porting (e.g., manifolding) feature which eliminates the need for a separate step to seal individual components prior to assembly of the filtration cassette. Filtration cassettes of the present invention can be manufactured from conventional membrane and flow screen components and can utilize both injection molding and vacuum assisted resin transfer molding fabrication processes.

2. Background

Filtration cassettes are used in a variety of biotechnology and food processing applications. These cassettes typically comprise a stacked assembly of porous membrane components and filtrate and retentate flow screen components. During cross-flow filtration, a suspension is continually pumped into the retentate ports and through the cassette. Product that passes through the membrane is collected and passed out, e.g., drained, through the filtrate ports.

Filtration cassettes have conventionally been made using a multi-step process (see, e.g., U.S. Pat. No. 4,715,955). Generally, unused manifold ports on each of the individual flow screens (e.g., filtrate and retentate) are sealed. For example, in the case of the filtrate flow screen, ports utilized for the distribution of retentate on other layers must be sealed about their perimeter to prevent mixing. This step can also be accomplished while binding one or more flow screens to the filtration membrane layer in the production of a subassembly. By either mode, a fixture is required to hold the flow screen in place and introduce resin and vacuum appropriately.

Next, component membranes or subassemblies and flow screens which have been sealed as described above are layered within a mold or other fixture according to the design requirements for the finished filtration cassette. Once the components have been assembled within the mold, a resin is introduced about the periphery. Using conventional vacuum transfer molding techniques, the resin is drawn into the edges of the cassette assembly. Once hardened, the resin provides structural support and edge sealing around the cassette.

The resulting fabricated filtration cassette may then be utilized for its intended application by fixing it between end plates, which provide appropriate manifolding and a means of compression. The compression allows sealing between the filtration cassette and the manifold within the endplate, as well as sealing between the components of the cassette itself. This conventional fabrication process is time intensive, costly and cannot be easily automated. Further, the compression required for sealing of the fabricated cassette, both between components and between the cassette and the manifolds within the end plate, results in reduced seal reliability.

Given these and other deficiencies observed in the art, it would be highly desirable to develop improved filtration cassettes and methods for their fabrication. It would be particularly desirable to improve seal reliability within the fabricated filtration cassette. Still further, it would be equally desirable to reduce time and manufacturing costs associated with filtration cassette fabrication.

SUMMARY OF THE INVENTION

The present invention provides improved cross-flow filtration cassettes and methods for their fabrication. Cassettes of the invention are characterized, in part, by an internal manifold design. The novel features of the present invention permit internal port sealing of the flow screen components contemporaneously with encapsulation of the filtration cassette. In that way, the present invention eliminates the need for separate port sealing of individual components prior to assembly of the filtration cassette.

Preferred filtration cassettes of the invention generally comprise one or more filter membranes, each having at least one port for filtrate flow and at least one port for retentate flow; one or more filtrate flow screens, each having at least one port for filtrate flow and at least one port for retentate flow and further having one or more channels in proximity to and at least partially surrounding the port for retentate flow; and one or more retentate flow screens, each having at least one port for filtrate flow and at least one port for retentate flow and further having one or more channels in proximity to and at least partially surrounding the port for filtrate flow. In accordance with the present invention, sealant is introduced about the periphery of the one or more filter membranes, filtrate flow screens, and retentate flow screens to encapsulate the periphery thereof. The sealant also seals the channels of the one or more filtrate flow screens and retentate flow screens. The sealed channels selectively block the one or more ports in proximity thereto. In that way, certain ports selectively remain closed or open and undesired flow is reduced or eliminated.

Through the number, shape, and placement of sealant holes (optional) and channels cut within the flow screen components, sealing resin introduced during edge encapsulation is drawn into the individual flow screen components within the assembly to seal certain ports while leaving others unsealed. Thus, the sealing of unused manifold openings/ports within each particular flow screen occurs in combination for all components of the filtration cassette assembly and in combination with the edge encapsulation of the assembled filtration cassette components. Filtration cassettes of the present invention can be manufactured from conventional membrane and flow screen components and can utilize both injection molding and vacuum assisted resin transfer molding fabrication processes.

The present invention allows for the fabrication of filtration stacks with a minimum of labor, thereby dramatically reducing their cost and allowing for process automation. Additionally, in accordance with the present invention, the ports are sealed by adhesion of the sealant to the cassette components, not by compression of the endplates or other compression means. This feature provides notable advantages as compared to conventional cassettes and methods. For instance, sealing by adhesion in accordance with the invention, reduces the compression required on the final stack, improves the reliability of the seals and allows for the use of a wider variety of sealants/resins. Further, end plates may be molded into the filtration cassette thereby producing an entire stack (e.g., filtration cassette and end plates) in one step.

Other aspects of the invention and related methods are discussed infra.

BRIEF DESCRIPTION OF THE DRAWINGS

FIGS. 2A–2C are top views of the flow screen and membrane components for a filtration cassette of the present invention having both sealant holes and channels.

FIGS. 3A–3C are top views of the flow screen and membrane components of one embodiment of the present invention showing exemplary sealant hole and channel configurations.

DETAILED DESCRIPTION OF THE INVENTION

As discussed above, the present invention provides improved filtration cassettes and methods of fabricating cross-flow filtration cassettes. Cassettes and methods of the invention feature an internal manifold design. In accordance with the present invention, internal port sealing of the flow screen components occurs within the encapsulation step and without the need for separate port sealing of individual components prior to assembly of the filtration cassette.

Figure 1A:
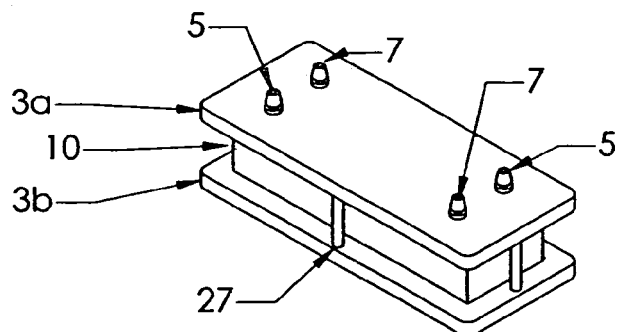
FIG. 1A is a side view of a prior art filtration cassette.
Figures 1B, 1C, 1D:
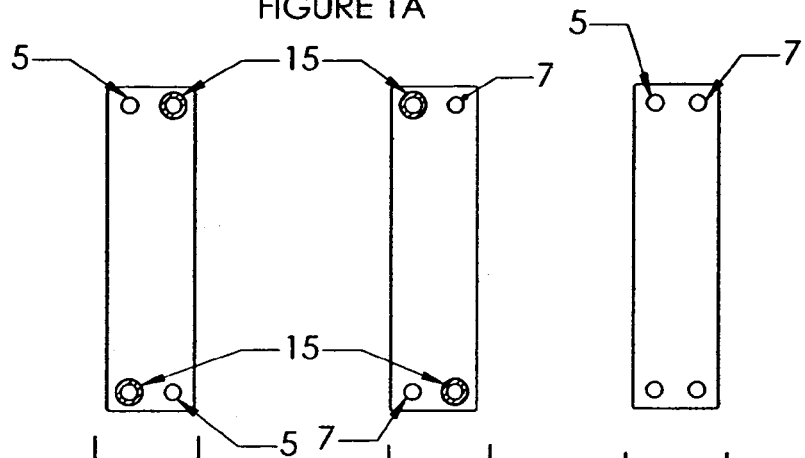
FIGS. 1B–1D are top views of the flow screen and membrane components of a prior art filtration cassette.

Cassettes and methods of the invention and their distinctions from the prior art, will be further understood with reference to the drawings within. Referring to FIG. 1A, a filtration cassette 10, representative of a typical embodiment of the prior art, is shown fixed between a first endplate 3a on the top of cassette 10 and a second endplate 3b on the bottom of cassette 10 through a compression means 27. Manifolding for filtrate 5 and retentate flow 7 also is depicted. Referring also to FIGS. 1B–1D, the filtration cassette 10 is comprised of a stack of filtrate flow screens 9, retentate flow screens 11, and filter membranes 13, with the final stacking configuration of the components dependent upon the capacity requirements of the completed filtration cassette.

Referring in particular to FIGS. 1B–1D, a prior art filtrate flow screen 9, retentate flow screen 11, and filter membrane 13 are shown. Each of the flow screens 9 and 11 and membrane 13 components contain ports to allow for filtrate and retentate flow through the cassette. Typically, two sets of ports are cut for the manifolding of each of the filtrate 5 and retentate 7 flows (e.g., at least one inlet and at least one outlet for each flow). On the filtrate 9 and retentate 11 flow screen, sealed ports 15 are utilized to prevent undesirable flow, e.g., into the wrong flow screens. In the prior art, all ports are cut into individual flow screens and one or more such flow screens are stacked within a mold. Ports which are to remain unsealed are closed off and sealant is introduced into the mold. A vacuum is applied to pull the sealant into the porous flow screens and seal the open ports on such flow screens.

Figure 1E:
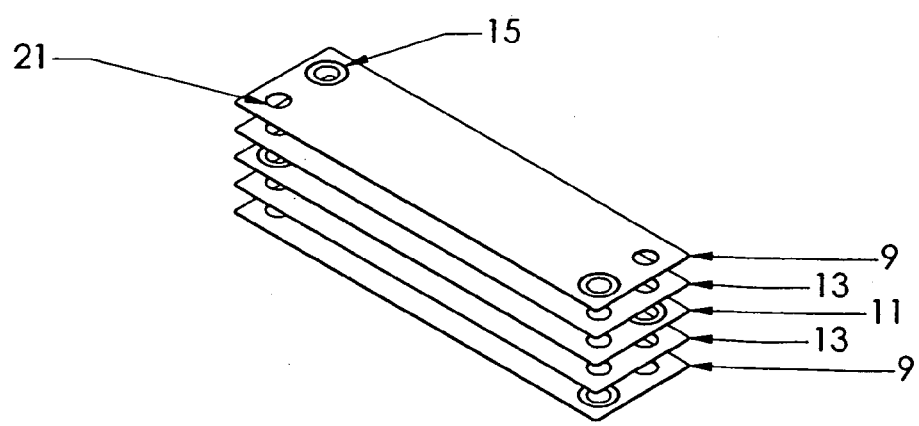
FIG. 1E is an exploded view of the flow screen and membrane components of a prior art filtration cassette.
Figure 1F:
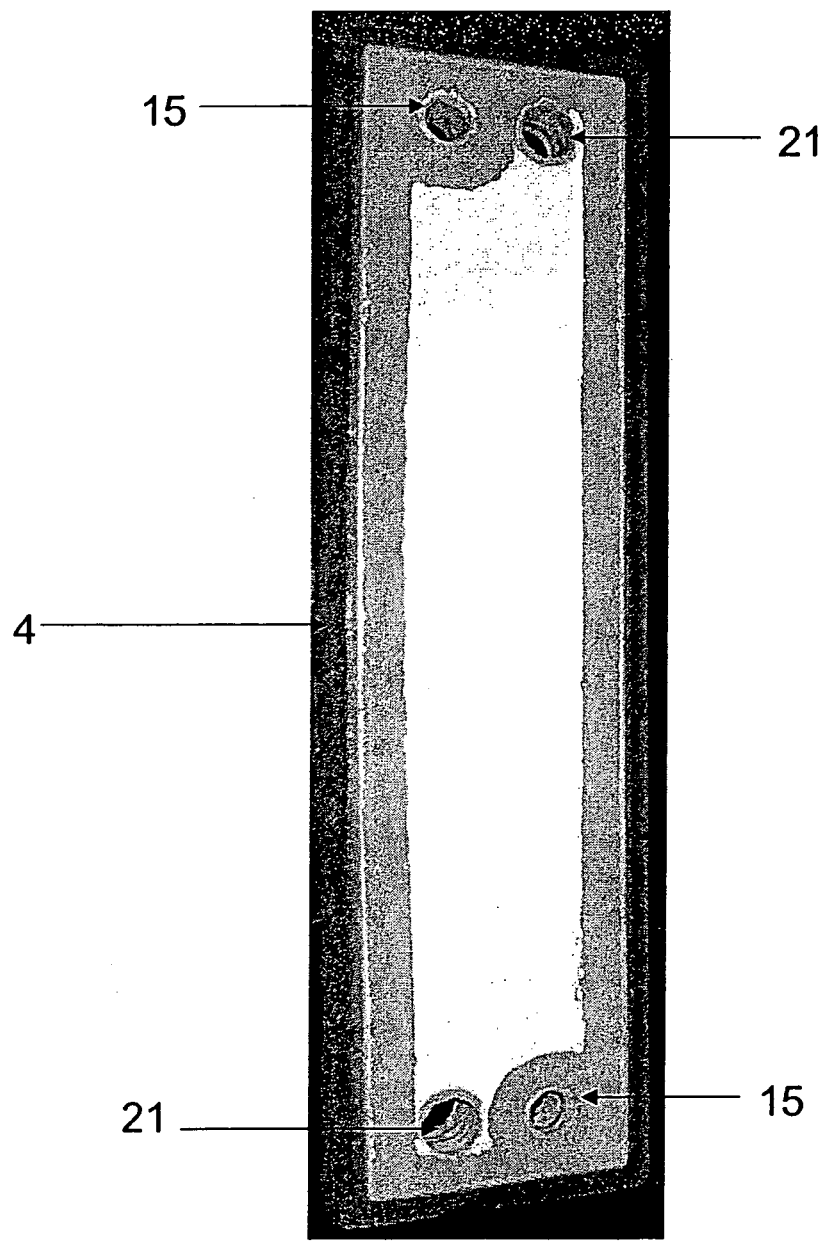
FIG. 1F is a photographic image of a prior art filtration cassette.

As shown in FIG. 1E, individual filter membrane 13 and filtrate and retentate flow screens 9 and 11 of the prior art having appropriate sealed ports 15 and unsealed ports 21 are assembled into the required filtration cassette design. The assembly is placed in a mold and sealant is introduced about the periphery of the assembly. A vacuum is pulled which infuses open peripheral edges of the components with the sealant to encapsulate the entire periphery of the filtration cassette. FIG. IF shows a photographic image of the assembled filtration cassette of the prior art; additional reference to the encapsulated periphery is indicated by reference numeral 4.

Unlike prior art methods in which sealing of the unused ports occurs prior to cassette assembly, the present invention provides a method for sealing the unused ports of each component simultaneously and in conjunction with the edge encapsulation of the filtration cassette, either using injection molding or vacuum resin transfer molding techniques.

Preferred methods for fabricating a filtration cassette of the invention generally comprise providing one or more filter membranes, each having at least one port for filtrate flow and at least one port for retentate flow; providing one or more filtrate flow screens, each having at least one port for filtrate flow and at least one port for retentate flow and further having one or more channels in proximity to and at least partially surrounding the port for retentate flow; and providing one or more retentate flow screens, each having at least one port for filtrate flow and at least one port for retentate flow and further having one or more channels in proximity to and at least partially surrounding the port for filtrate flow. The components of the filtration cassette (filter membrane, filtrate flow screen and retentate flow screen) are stacked in a number and manner of assembly which reflects the desired output/cassette design. Encapsulation of the components of the filtration cassette is then achieved by introducing a sealant about the periphery of the filter membrane, the filtrate flow screen, and the retentate flow screen. The sealant contemporaneously seals the respective channels of these components.

In preferred embodiments of the present invention, each of the filter membranes, filtrate flow screens and retentate flow screens will comprise at least two ports for filtrate flow and at least two ports for retentate flow. As will be appreciated by the skilled artisan, one of the two ports provides access for "in-flow", while the other accommodates "out-flow".

Referring again to the drawings, filtrate 9' and retentate 11' flow screens of the present invention are preferably cut from a woven or mesh material, including but not limited to polyester, polypropylene, other plastics, and the like. Indeed, any form which will allow fluid flow to travel parallel and through the sceen will be generally suitable for use in accordance with the invention.

As will be appreciated by the skilled artisan, filter membranes 13' of the present invention are cut from a variety of membrane materials known in the art. By way of illustration, the example below utilizes a porous backed polysulfone membrane. In that way, a non-woven material may be utilized as a backing which provides strength and serves as a carrier. Preferred membrane filters include ultrafiltration, microporous, nanofiltration or reverse osmosis filters formed from polyvinylidene fluoride (PVDF), polysulfone, polyethersulfone, regenerated cellulose, polyamide, polypropylene, polyethylene, polytetrafluoroethylene, cellulose acetate, polyacrylonitrile, vinyl copolymer, polyacrylonitrile, vinyl copolymer, polyacrylonitrile, vinyl copolymer, polycarbonate, PFA, blends thereof or the like. In a particularly preferred embodiment of the invention, filter membranes 13' are cut from porous polymer material, such as polysulfone membranes made via casting and quenching techniques (i.e., phase inversion), track etched polycarbonates, or other similar materials.

Preferably, all of the components are cut to roughly the same shape and perimeter. Ports are cut in the filter membrane 13' and flow screens 9' and 11' to provide manifolding for filtrate flow 5' and retentate flow 7' through the resulting cassette 20 (shown in FIG. 5). In the present invention, channels 19 also are cut in each of the filtrate flow screens 9' and retentate flow screens 11' through which a sealant can travel or otherwise be guided from the edge of the flow screens to close off unused ports, contemporaneously with the encapsulation of the edge of the filtration cassette 20. Using the shape and placement of the channels in each of the components, sealant flow into the component is controlled. Specifically, the sealant flows faster in the open areas defined by the channels in each component than through the remainder of the component. Channels are not cut for ports that are not to be sealed on the individual component.

Depending upon the length of the channels and flow screen geometry (e.g., spacing and diameter of the mesh weave), sealant flow from the edge may not be adequate to completely seal off the port. In such instances, one or more sealant holes 17 are cut into the components and are utilized to enhance sealing of the channels 19. Sealant holes 17 draw or otherwise permit entry of additional sealant into the channels 19.

Referring now to FIGS. 2A–C, a basic channel 19 pattern for each component within a filtration cassette 20 of the present invention is shown, in which a series of sealant holes 17 are added to feed sealant to the channels 19. The filter membrane 13' is cut with two sets of ports and sealant holes 17 by punching with a steal rule die. The filtrate 9' and retentate 11' flow screens are cut with the same number and size ports as the filter membrane 13' with both sealant holes 17 and channels 19 added. Channels 19 are cut in the flow screens 9' and 11' to align with the sealant holes 17 of the other components of the cassette. Two separate patterns of channels 19 are needed; one for each of the flow screens 9' and 11' to correspond to the distribution of filtrate 5' and retentate 7'.

Figure 2D:
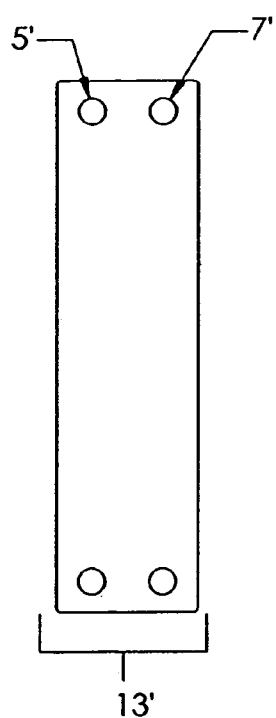
FIGS. 2D–2F are top views of the flow screen and membrane components for a filtration cassette of the present invention having channels only.
Figure 2E:
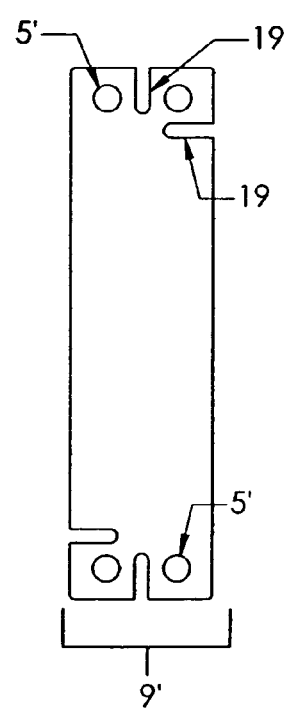
Figure 2F:
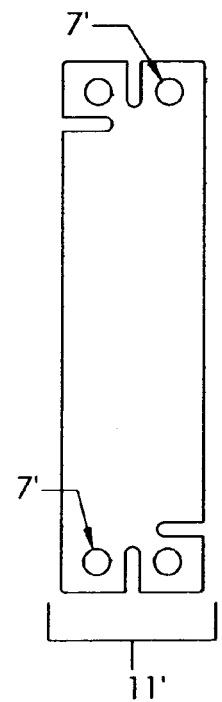
Figures 4A, 4B:
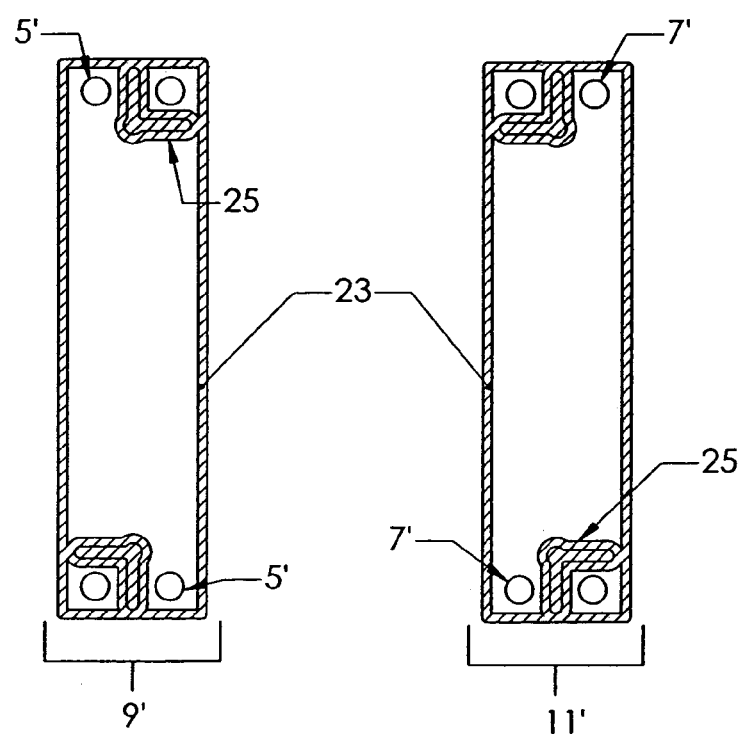
FIGS. 4A–4B are top views of the flow screens shown in FIGS. 2B–2C after sealing/encapsulation has occurred.
Figures 4C, 4D:
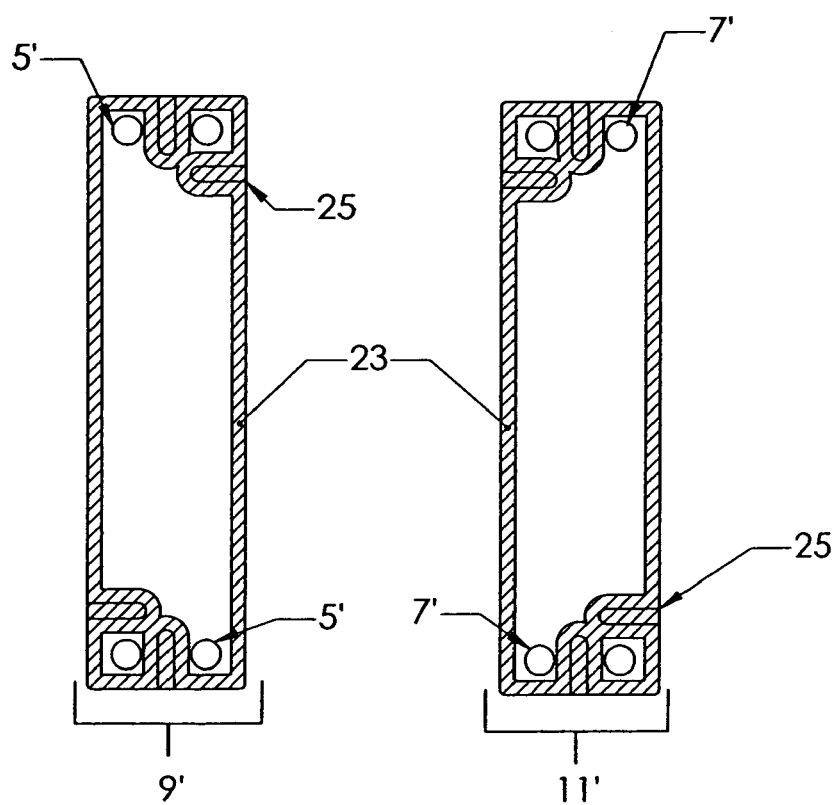
FIGS. 4C–4D are top views of the flow screens shown in FIGS. 2E–2F after sealing/encapsulation has occurred.

FIGS. 2D–F show an alternate basic pattern of channels 19 for each component within filtration cassette 20 of the present invention without the addition of the sealant holes 17 described above. In that embodiment, channels 19 are cut from the edge of each individual component 9', 11' and 13', thereby allowing resin to flow from the edge into channels 19.

FIGS. 3A–C show an embodiment of sealant holes 17 and channels 19 on filter membrane 13', filtrate flow screen 9' and retentate flow screen 11' designed for filtration cassette 20 to match with existing end-plate fixtures. As shown, channels 19 were added to the membrane 13' portion to improve sealant flow.

Once suitable sealant holes 17 and/or channels 19 are cut in each of the components 9', 11', and 13' as described above, the components are assembled according to the desired filtration cassette design and output requirements. A very basic design would include a first filtrate flow screen 9', a first filter membrane 13', a retentate flow screen 11', a second filter membrane 13' and a second filtrate flow screen 9'. However, those skilled in the art will recognize that filtration cassettes can have any desired number of flow screens and filter membrane components assembled together.

Regardless of the particular design, the components are assembled such that the ports of each component in the assembly are aligned with the ports of the other components. The assembly is then placed within a mold or cavity and held in place within the mold by a top plate with an appropriate means of compression, such as a simple clamp or bolt pattern. If sealant holes 17 are utilized, then the top plate will also contain holes through which the sealant can be introduced into the assembly.

To encapsulate the filtration cassette assembly described above using vacuum resin transfer molding techniques, a sealant is introduced about the periphery and into any sealant holes of all assembled components. A vacuum is pulled through each of the ports within the assembly. The pressure differential pulls sealant into the edges of the assembly thereby encapsulating all the edges of the components in the assembly together and forming the assembly into a filtration cassette. In addition, the same pressure differential pulls the sealant from the edge into the channels 19 cut in each of the flow screen components. If sealant holes are present, the pressure differential pulls the sealant through the sealant holes into the channels. The sealant is drawn more quickly into the open channels than into the flow screen material and seals each port around which the channels are cut. Sealant still flows into the flow screen material, but at a rate too slow to close off the associated port. The edge encapsulation and port sealing is complete when the sealant flows through the channels to meet and seal off the appropriate ports.

Throughout the cassette assembly, each flow screen is appropriately sealed such that only the manifold ports of interest remain open on each individual layer. The remaining ports are enclosed by the channels that are now sealed. The edges of the assembly also are encapsulated by sealant. The pressure differential and time required to accomplish the sealing process is a function of the materials used for the flow screen, membrane components and the sealant, including but not limited to mesh size of the screen, as well as the viscosity and flow characteristics of the sealant.

To encapsulate a filtration cassette of the present invention using injection molding techniques, sealant is injected around the periphery of the assembly and into any sealant holes using a driving pressure means. In the preferred embodiment, a thermoplastic resin is utilized as the sealant and is injected into the injection holes and around the edges of the assembly and allowed to cool and harden prior to removal of the filtration cassette from the mold. A mold capable of accommodating the associated temperature and pressure is utilized.

The sealant used for encapsulation and port sealing is selected such that it has the required chemical and mechanical properties for the conditions found in an operating filtration system, including but not limited to low leachables, temperature stability, and solvent compatibility. Suitable sealants include both thermoplastics and thermoset elastomers. Preferred thermoplastics include thermoplastic olefin elastomers, thermoplastic polyurethane, plastomer, polypropylene, polyethylene, polytetrafluoroethylene, fluorinated polypropylene and polystyrene. Preferred thermoset elastomers include epoxy resins, urethanes, silicones, fluorosilicones, and vinyl esters.

FIGS. 4A–4B and FIGS. 4C–4D show the encapsulated edge 23 and sealed channels 25 resulting from the embodiments shown in FIGS. 2A–2C and FIGS. 2D–2F, respectively. For example, in the case of the retentate flow screen 11' shown in FIGS. 4A–4B, the retentate ports 7' remain open after the encapsulation, while the filtrate ports 5' have been closed on this particular component/layer. Indeed, the novel design of the present invention selectively blocks those ports which are intended to be closed, by sealing of the respective channels in proximity to those ports.

Figure 5:
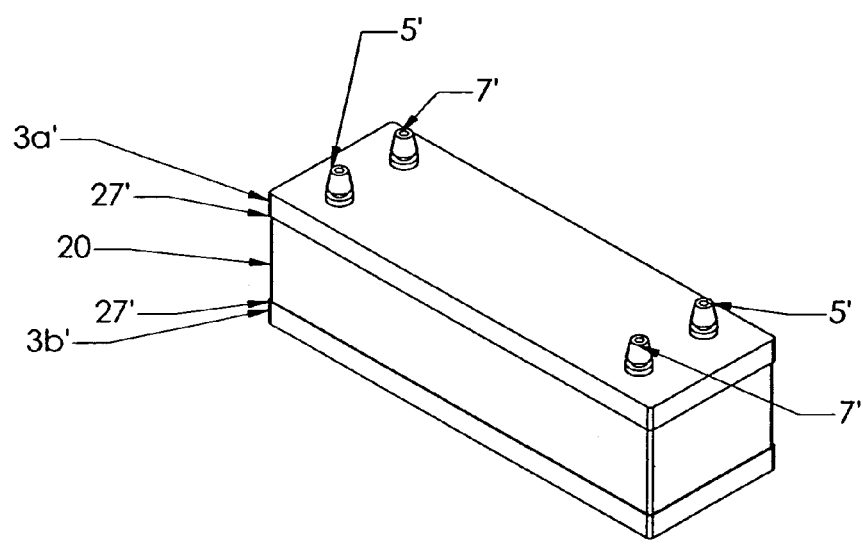
FIG. 5 is a top view of a filtration cassette of the present invention having bonded endplates.

Referring now to FIG. 5, end plates 3a' and 3b' may be bonded directly to the filtration cassette 20 during the encapsulation step, thereby producing an entire stack (e.g., filtration cassette and end plates). Rather than using a removable means of compression in the encapsulation step, the top and bottom plates of the mold can be replaced with end plates 3a' and 3b'. Upon encapsulation, end plates 3a' and 3b' are incorporated into the filtration cassette 20. If sealant holes 17 are utilized in distributing sealant into the interior of the cassette 20, sealant holes 17 are added to at least one of the end plates.

Several benefits result from the bonding of the end plates directly to the filtration cassette. For instance, removing the need to compress the filtration cassette between end plates significantly improves the reliability of the filter. Also, the incorporated end plates can include fittings to further simplify the filter. In addition, the bonded filtration cassette and end plate assembly could be made disposable, thereby eliminating the need for fixed hardware end plates and their cleaning and sterilization.

Figure 6:
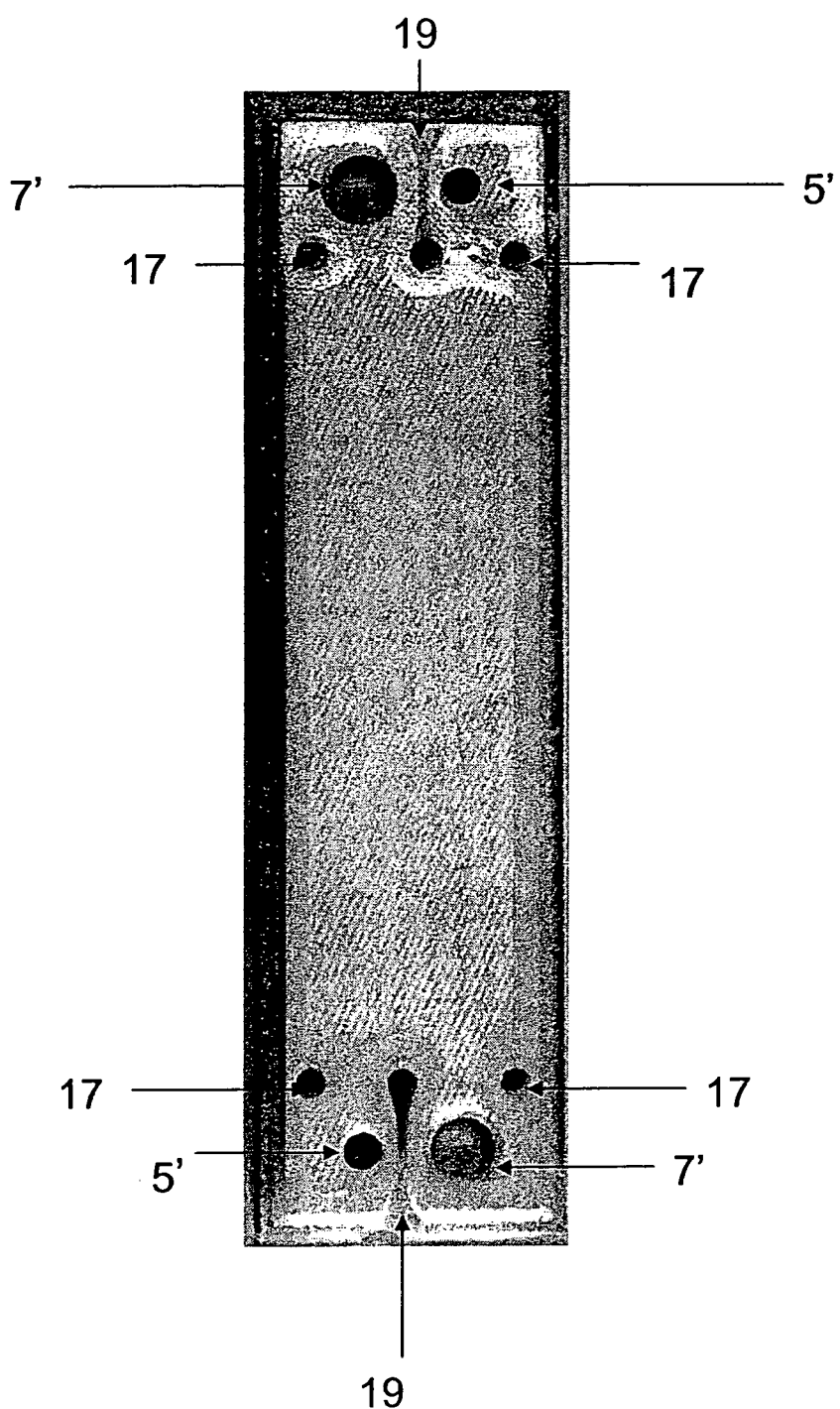
FIG. 6 is a photographic image of a filtration cassette made via the present invention.

FIG. 6 is a photographic image of the filtration cassette of the present invention showing sealing and edge encapsulation. Channels 19, sealant holes 17, and respective ports for filtrate flow 5' and retentate flow 7' are shown, as is the encapsulated edge 23 about the periphery of the cassette.

The preferred filtration cassette of the present invention is further illustrated by means of the following illustrative embodiment, which is given for purpose of illustration only and is not meant to limit the invention to the particular components and amounts disclosed therein.

EXAMPLE 1

Using the channel and sealant hole patterns depicted in FIGS. 3A–C, filtrate and retentate flow screens were cut from polyester screen stock. Microporous membranes of backed polysulfone were made through conventional processes know in the art. Channels were cut in the filter membranes in accordance with the pattern shown in FIGS. 3A–C. Several each of the filtrate flow screens, retentate flow screens, and membranes were layered in a mold. The assembly was encapsulated with the silicone resin, CF 19-2186, (available commercially from NuSil Technology of Carpinteria, Calif.) by applying a vacuum of 10 inches Hg for approximately 20 seconds.

Table 1 shows results for water flux, pressure drop and 15 kD blue dextran passage properties of the filtration cassettes made via the processes described above. For comparison, water flux, pressure drop and 15 kD blue dextran passage properties of filtration cassettes fabricated through prior art methods are shown in Table 2.

The data shows comparable performance between our cassette and that of the prior art. While maintaining an optimum level of performance, the present invention provides several advantages over conventional cassettes and processes for their fabrication. Notable advantages include improved seal reliability within the fabricated cassette, reduced time and manufacturing costs and suitability for automation.

TABLE 1

| Pressure | | | | Avg. Pressure | | | | | |
| --- | --- | --- | --- | --- | --- | --- | --- | --- | --- |
| Feed Pfeed (psi) | Retenate Pret (psi) | Filtrate Pfil (psi) | Pressure Drop (Pfeed-Pret) (psi) | (Pfeed + Pret)/ 2-Pfil (psi) | Water Flux ml/min/cm$^2$ | Flux Pressure | K15 flux ml/min/cm$^2$ | Flux/Pressure | K15 passage % |
| 16 | 4 | 0 | 12 | 10 | 0.126 | 0.0126 | | | |
| 21 | 10 | 0 | 11 | 15.5 | 0.182 | 0.0117 | | | |
| 24 | 13 | 0 | 11 | 18.5 | 0.229 | 0.0124 | | | |
| 29 | 18 | 0 | 11 | 23.5 | 0.288 | 0.0123 | | | |
| 15 | 3 | 0 | 12 | 9 | | | 0.106 | 0.0118 | 47 |
| 21 | 10 | 0 | 11 | 15.5 | | | 0.185 | 0.0106 | 49 |
| 25 | 14 | 0 | 11 | 19.5 | | | 0.191 | 0.0098 | 52 |

Protonex Cassette
Membrane area: 0.5 ft$^2$ 466.7 cm$^2$
Lot#: 11602

TABLE 2

| Pressure | | | | Avg. Pressure | | | | | |
| --- | --- | --- | --- | --- | --- | --- | --- | --- | --- |
| Feed Pfeed (psi) | Retenate Pret (psi) | Filtrate Pfil (psi) | Pressure Drop (Pfeed-Pret) (psi) | (Pfeed + Pret)/ 2-Pfil (psi) | Water Flux ml/min/cm$^2$ | Flux Pressure | K15 flux ml/min/cm$^2$ | Flux/Pressure | K15 passage % |
| 15 | 4 | 0 | 11 | 9.5 | 0.141 | 0.0148 | | | |
| 20 | 10 | 0 | 10 | 15 | 0.206 | 0.0137 | | | |
| 26 | 15 | 0 | 11 | 20.5 | 0.288 | 0.0140 | | | |
| 15 | 4 | 0 | 11 | 9.5 | | | 0.11 | 0.0116 | 45 |
| 20 | 10 | 0 | 10 | 15 | | | 0.169 | 0.0113 | 46 |
| 26 | 14 | 0 | 12 | 20 | | | 0.199 | 0.0100 | 47 |

Traditional Cassette
Membrane area: 0.5 ft$^2$ 466.7 cm$^2$
Lot#: ML011602IL013

The invention claimed is:

1. A filtration cassette comprising:
   one or more filter membranes, each having at least one port for filtrate flow and at least one port for retentate flow;
   one or more filtrate flow screens, each having at least one port for filtrate flow and at least one port for retentate flow and further having one or more channels in proximity to and at least partially surrounding the port for retentate flow, wherein the one or more channels on the filtrate flow screen permit introduction of a sealant such that the port for retentate flow on the filtrate flow screen may be selectively blocked; and
   one or more retentate flow screens, each having at least one port for filtrate flow and at least one port for retentate flow and further having one or more channels in proximity to and at least partially surrounding the port for filtrate flow, wherein the one or more channels on the retentate flow screen permit introduction of a sealant such that the port for filtrate flow on the retentate flow screen may be selectively blocked;
   wherein the one or more filter membranes, filtrate flow screens and retentate flow screens are assembled and encapsulated about the periphery thereof by sealant; and
   wherein the sealant contemporaneously seals the respective channels of the one or more filtrate flow screens and retentate flow screens to selectively block one or more ports in proximity thereto.

2. The filtration cassette of claim 1, wherein the channels are cut from the respective edges of the one or more filtrate flow screens and retentate flow screens.

3. The filtration cassette of claim 1, wherein each of the one or more filter membranes, filtrate flow screens and retentate flow screens further comprises one or more sealant holes to enhance sealing of the respective channels.

4. The filtration cassette of claim 3, wherein the sealant holes of the one or more filter membranes, filtrate flow screens and retentate flow screens are in respective alignment with each other.

5. The filtration cassette of claim 1, wherein the ports of each of the filter membrane, filtrate flow screen and retentate flow screen components are in respective alignment with each other.

6. The filtration cassette of claim 1, wherein the filter membrane is positioned, respectively, between the filtrate flow screen and the retentate flow screen.

7. The filtration cassette of claim 1, further comprising a first and second end plate attached at either end thereof.

8. The filtration cassette of claim 7, wherein the first and second end plates are encapsulated into the cassette.

9. The filtration cassette of claim 1, wherein the filter membrane is selected from the group consisting of ultrafiltration, microporous, nanofiltration or reverse osmosis filters formed from polyvinylidene fluoride (PVDF), polysulfone, polyethersulfone, regenerated cellulose, polyamide, polypropylene, polyethylene, polytetrafluoroethylene, cellulose acetate, polyacrylonitrile, vinyl copolymer, polyacrylonitrile, vinyl copolymer, polyacrylonitrile, vinyl copolymer, polycarbonate, PFA, and blends thereof.

10. The filtration cassette of claim 1, wherein the filter membranes comprise a porous polymer material.

11. The filtration cassette of claim 10, wherein the porous polymer material comprises a polysulfone membrane.

12. The filtration cassette of claim 1, wherein the filtrate flow screens and retentate flow screens comprise a mesh material.

13. The filtration cassette of claim 12, wherein the mesh material comprises polyester or polypropylene.

14. The filtration cassette of claim 1, wherein the sealant is selected from the group consisting of thermoplastic materials and thermoset elastomers.

15. The filtration cassette of claim 14, wherein the thermoplastic material is selected from the group consisting of thermoplastic olefin elastomers, thermoplastic polyurethane, plastomer, polypropylene, polyethylene, polytetrafluoroethylene, fluourinated polypropylene and polystyrene.

16. The filtration cassette of claim 14, wherein the thermoset elastomers are selected from the group consisting of epoxy resins, urethanes, silicones, fluorosilicones, and vinyl esters.

17. The filtration cassette of claim 1, wherein each of the one or more filter membranes, filtrate flow screens and retentate flow screens are cut to roughly the same shape and perimeter.

18. A filtration stack assembly comprising one or more filtration cassettes and a first and a second end plate attached at either end thereof, wherein each filtration cassette comprises:
   one or more filter membranes, each having at least one port for filtrate flow and at least one port for retentate flow;
   one or more filtrate flow screens, each having at least one port for filtrate flow and at least one port for retentate flow and further having one or more channels in proximity to and at least partially surrounding the port for retentate flow, wherein the one or more channels on the filtrate flow screen permit introduction of a sealant such that the port for retentate flow on the filtrate flow screen may be selectively blocked; and
   one or more retentate flow screens, each having at least one port for filtrate flow and at least one port for retentate flow and further having one or more channels in proximity to and at least partially surrounding the port for filtrate flow, wherein the one or more channels on the retentate flow screen permit introduction of a sealant such that the port for filtrate flow on the retentate flow screen may be selectively blocked;
   wherein the one or more filter membranes, filtrate flow screens and retentate flow screens are assembled and encapsulated about the periphery thereof by sealant; and
   wherein the sealant contemporaneously seals the respective channels of the one or more filtrate flow screens and retentate flow screens to selectively block one or more ports in proximity thereto.

19. A method of fabricating a filtration cassette comprising:
   providing one or more filter membranes, each having at least one port for filtrate flow and at least one port for retentate flow;
   providing one or more filtrate flow screens, each having at least one port for filtrate flow and at least one port for retentate flow and further having one or more channels in proximity to and at least partially surrounding the port for retentate flow, wherein the one or more channels on the filtrate flow screen permit introduction of a sealant such that the port for retentate flow on the filtrate flow screen may be selectively blocked; and
   providing one or more retentate flow screens, each having at least one port for filtrate flow and at least one port for retentate flow and further having one or more channels in proximity to and at least partially surrounding the port for filtrate flow, wherein the one or more channels on the retentate flow screen permit introduction of a sealant such that the port for filtrate flow on the retentate flow screen may be selectively blocked;

introducing a sealant about the periphery of the filter membrane, the filtrate flow screen, and the retentate flow screen wherein the sealant conteporaneously encapsulates the periphery thereof and seals the one or more channels in proximity to and at least partially surrounding the ports for retentate flow and the port for filtrate flow.

20. The method of claim 19, wherein each of the filter membrane, filtrate flow screen and retentate flow screen components comprise sealant holes to enhance sealing of the respective channels.

21. The method of claim 19, further comprising assembling the one or more filter membranes, filtrate flow screens and retentate flow screens such that their respective ports are in alignment prior to introducing the sealant about the periphery thereof.

22. The method of claim 21, wherein a series of filter membranes, filtrate flow screens and retentate flow screens are assembled such that each respective membrane filter is positioned between a respective filtrate flow screen and respective retentate flow screen.

23. The method of claim 19, further comprising attaching a first and second end plate at either end of the cassette thereof.

24. The method of claim 23, further comprising encapsulating the end plates into the cassette.

25. The method of claim 19, further comprising encapsulating the filtration cassette about the periphery thereof and sealing the respective channels using injection molding or vacuum assisted resin transfer molding processes.

* * * * *